US012294835B2

(12) United States Patent
Gavish et al.

(10) Patent No.: US 12,294,835 B2
(45) Date of Patent: May 6, 2025

(54) SYSTEM AND METHOD FOR PERSONALIZED AUDITORY TRAINING

(71) Applicant: TUNED LTD., Gan Yoshiya (IL)

(72) Inventors: Omri Gavish, Gan Yoshiya (IL); Ron Ganot, Kfar Saba (IL)

(73) Assignee: TUNED LTD., Gan Yoshiya (IL)

( * ) Notice: Subject to any disclaimer, the term of this patent is extended or adjusted under 35 U.S.C. 154(b) by 177 days.

(21) Appl. No.: 18/197,287

(22) Filed: May 15, 2023

(65) Prior Publication Data

US 2024/0388856 A1 Nov. 21, 2024

(51) Int. Cl.
*H04R 25/00* (2006.01)

(52) U.S. Cl.
CPC ....... *H04R 25/505* (2013.01); *H04R 2225/41* (2013.01); *H04R 2225/43* (2013.01)

(58) Field of Classification Search
CPC .............. H04R 25/505; H04R 2225/41; H04R 2225/43; H04R 25/70
See application file for complete search history.

(56) References Cited

U.S. PATENT DOCUMENTS

| | | | | |
|---|---|---|---|---|
| 2015/0208956 A1* | 7/2015 | Schmitt | A61B 5/123 | 600/559 |
| 2019/0394586 A1* | 12/2019 | Pedersen | H04R 25/407 | |

FOREIGN PATENT DOCUMENTS

| | | | |
|---|---|---|---|
| DE | 102006047690 | A1 | 4/2008 |

* cited by examiner

*Primary Examiner* — Tuan D Nguyen
(74) *Attorney, Agent, or Firm* — The Roy Gross Law Firm, LLC; Roy D. Gross

(57) ABSTRACT

A method for personalized auditory training of a hearing aid user, is disclosed herein. The method comprises providing, via a user interface, a sound stimulus, the sound stimulus comprising software-generated speech structure, wherein the voice of the software-generated speech structure is a replica of a real-life voice recording of a person of the user's choice. Recording a response of the user to the sound stimulus, wherein the response comprises the user's judgement regarding the provided sound stimulus. Analyzing, using a processing circuit, the correctness of the user's judgement, and providing, via the user interface, a feedback to the user regarding the correctness of the judgement.

16 Claims, 5 Drawing Sheets

SYSTEM AND METHOD FOR PERSONALIZED AUDITORY TRAINING

TECHNOLOGICAL FIELD

The present disclosure generally relates to system and method for auditory training of hearing aid users, specifically to auditory training using voice replicas of real-life recordings of subjects in the user's life/surroundings.

BACKGROUND

Difficulty in understanding spoken speech in quiet and in noise is a common complaint among aging adults and hearing impairment.

While many people with hearing loss can be helped adequately with hearing aids or cochlear implants alone, others require more intensive hearing rehabilitation, including auditory training, for optimal speech perception with their hearing devices.

Auditory training typically includes exercises, also known as listening trials, where the person (1) listens to a large number of presentations of speech sounds (typically pre-recorded) or other kinds of sounds, (2) makes a judgement after listening to each presentation such as identifying the sound heard, and (3) receives feedback after each attempt about whether the judgment was correct or incorrect.

Speech perception research in the neuroscience literature has shown that hearing aid and cochlear implant users can improve their perception of speech sounds following intensive auditory training. However, the improvement has been shown to be specific to the stimuli provided and almost no generalization of learning to other stimuli occurs.

There therefore remains a need for auditory training which takes into account the user's environment to thereby obtain an improved rehabilitation of a user's hearing.

SUMMARY

There is provided herein a system and method for auditory training of hearing aid users, specifically to auditory training using voice replicas of real-life recordings of meaningful subjects in the user's life/surroundings.

Advantageously, the herein disclosed auditory training is based on real life voices (stimuli). In short, the user will have the option to record samples of various talkers (e.g. family friends and/or significant others). A software will then be applied on the recordings to replicate the talker's voice which is then used to generate any word and/or sentence suitable for the training, in a process also referred to herein as voice cloning.

"Voice cloning" as used herein, refers to the creation of an artificial simulation of a person's voice by utilizing software (SW) which is capable of generating synthetic speech that closely resembles a targeted human voice. In some cases, the difference between the real and fake voice is imperceptible to the average person. Without being bound by any theory, neural network-based text-to-speech (TTS) models mimic the way the brain operates and are extraordinarily efficient at learning patterns in data. The SW uses a sequence-to-sequence model optimized for TTS to map a sequence of letters to a sequence of features that encode the audio. These features, are utilized to generate a dimensional audio spectrogram with frames computed every few milliseconds, capture not only pronunciation of words, but also various subtleties of human speech, including volume, speed and intonation. Finally these features are converted to a 24 kHz waveform.

Using voice cloning, the auditory training can be conducted according to professional methodology, while utilizing a voice cloned to be essentially identical to that of speakers relevant to the user, such as the voice of individuals which the user most often speaks with.

Advantageously, the utilized voice is essentially identical to that of the chosen individual, not only in accent, but preferably also in timbre, pitch, pace, flow of speaking and/or breathing.

As a further advantage, the software is further capable of modifying the cloned voice to portray a desired emotion, such as, but not limited to anger, fear, happiness, love or boredom.

As a result, the herein disclosed system and method for auditory training advantageously allows the user to focus the auditory training on voices that they really have difficulty hearing and/or voices that they are particularly keen on hearing, thus benefiting much more from the auditory training.

According to some embodiments, whenever the user is in a difficult listening situation, the herein disclosed system and method may allow him/her to record a sample of the acoustic environment, which recording can be later used as a background noise in the auditory training. For example, if the user eats dinner at a noisy restaurant and has difficulty following the conversation, they can simply record a sample of the background noise and use that specific noise to practice speech recognition with background noise. The advantage of this is that it allows the user to practice speech perception in real listening conditions that they encounter in daily life.

Moreover, one of the extreme difficulties hearing aid users have is listening to one speaker in a "cocktail party environment", in which many people speak together. The recorded speech stimuli of different significant others can also serve as background noise. For example, if the user wants to practice listening to one specific person (for example—his grandchild) when the background noise consists of speech of other people (other family members, as in a family dinner time) the user will be able to choose the target speaker and to create babble noise consisting of speech of other pre-recorded stimuli.

According to some embodiments, there is provided a method for personalized auditory training of a hearing aid user, the method comprising: providing, via a user interface, a sound stimulus, the sound stimulus comprising software-generated speech structure, wherein the voice of the software-generated speech structure is a replica of a real-life voice recording of a person of the user's choice; recording a response of the user to the sound stimulus, wherein the response comprises the user's judgement regarding the provided sound stimulus; analyzing, using a processing circuit, the correctness of the user's judgement; and providing, via the user interface, a feedback to the user regarding the correctness of the judgement.

According to some embodiments, the real-life voice replica comprises an accent, timbre, pitch, pace, flow of speaking and/or breathing of the person of the user's choice. Each possibility is a separate embodiment.

According to some embodiments, the real-life voice replica is algorithmically tweaked to portray a desired emotion and/or utterance.

According to some embodiments, the sound stimulus further comprises a background noise. According to some embodiments, the background noise has been recorded from a real-life surrounding of the user.

According to some embodiments, the sound stimulus comprises software-generated speech structures, generated based on a real-life voice replicas of more than one person (e.g. 2, 3, 4, or more individuals) of the user's choice.

According to some embodiments, the method further comprises recording real-life speech of the person of the user's choice.

According to some embodiments, the method further comprises providing a second sound stimulus, a predetermined time after the first sound stimulus, recording a response of the user to the second sound stimulus, wherein the response comprises the user's judgement regarding the provided sound stimulus; analyzing, using a processing circuit, the correctness of the user's judgement; and providing, via the user interface, a feedback to the user regarding the correctness of the judgement. According to some embodiments, the second sound stimulus comprising a different software-generated speech structure, generated based on the real-life voice replica of a person of the user's choice. According to some embodiments, the second sound stimulus is more complex than the first sound stimulus.

According to some embodiments, the method further comprises comparing the response of the user to the first stimulus to the response of the user to the second sound stimulus and providing an indication to the user regarding, via the user interface, an improvement in the user's hearing.

According to some embodiments, the sound stimulus is provided to the user via his/her hearing aid.

According to some embodiments, there is provided a method for generating a personalized auditory training program for a hearing aid user, the method comprising: recording a real-life voice sample of a person of the hearing aid user's choice, applying a speech cloning algorithm on the real-life voice sample to generate a plurality of auditory stimuli suitable for auditory training, the auditory stimuli comprising speech structures using a voice replicated from the real-life voice sample; and generating and storing a personalized training program by dividing the plurality of auditory stimuli into at least two training sessions, each training session comprising at least one auditory stimulus.

According to some embodiments, the method further comprises recording background noise and incorporating/integrating the background noise into one or more of the plurality of auditory stimuli. According to some embodiments, the background noise may be background speech.

According to some embodiments, the method further comprising algorithmically tweaking the voice of the speech structure to portray a desired emotion and/or utterance.

According to some embodiments, the dividing of the auditory stimuli into training sessions comprises categorizing the plurality of auditory stimuli based on the complexity of the speech structures.

According to some embodiments, the method further comprises presenting to the user, via a user interface, a scroll down menu of training session, the training session labeled according to the complexity of the speech structures included in the training session.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

In addition to the exemplary aspects and embodiments described above, further aspects and embodiments will become apparent by reference to the figures and by study of the following detailed descriptions.

BRIEF DESCRIPTION OF THE FIGURES

The invention will now be described in relation to certain examples and embodiments with reference to the following illustrative figures so that it may be more fully understood.

DETAILED DESCRIPTION

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

For convenience, certain terms used in the specification, examples, and appended claims are collected here. Unless otherwise defined, all technical and scientific terms used herein have the same meaning as commonly understood by one of ordinary skills in the art to which this invention pertains.

As used herein, the terms "approximately", "essentially" and "about" in reference to a number are generally taken to include numbers that fall within a range of 5% or in the range of 1% in either direction (greater than or less than) the number unless otherwise stated or otherwise evident from the context (except where such number would exceed 100% of a possible value). Where ranges are stated, the endpoints are included within the range unless otherwise stated or otherwise evident from the context.

As used herein, the singular forms "a," "an" and "the" include plural referents unless the context clearly dictates otherwise.

As used herein, "optional" or "optionally" means that the subsequently described event or circumstance does or does not occur, and that the description includes instances where said event or circumstance occurs and instances where it does not.

As used herein the term "user interface" may refer to a software with which a user interacts, and through which the user is provided with stimuli, such as a software generated sound stimulus.

Figure 1:
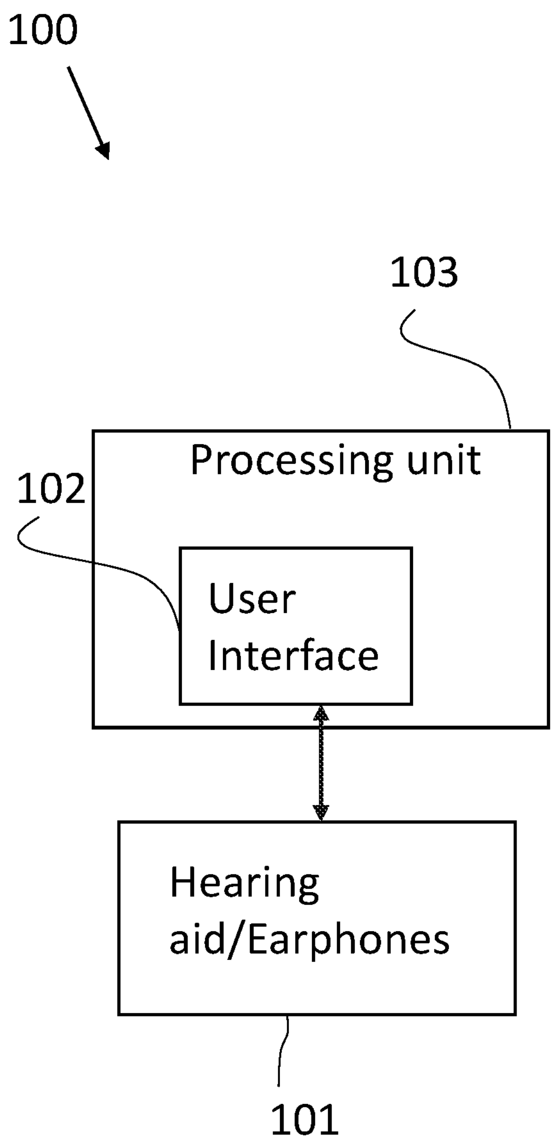
FIG. 1 is a schematic block diagram of a system for auditory training of a hearing aid user, according to some embodiments.

Reference is now made to FIG. 1, which is a schematic block diagram of a system 100 for auditory training of a hearing aid user, according to some embodiments. System 100 includes a hearing aid or earphones 101 of a user, which are in communication with a user interface 102 such as an application or a web page, and a processing unit 103.

According to some embodiments, user interface 102 may be running on a smartphone, a tablet, a computer or any other computerized device which is suitable for running software applications. According to some embodiments the hearing aid and or the computerized device on which the user interface is running, includes a recorder (not shown) configured to record voice samples, for example a user's vocal response, or a voice sample needed for the auditory training. According to some embodiments, processing unit 103, executes a code configured to generate a sound stimulus, which is provided to the user through user interface 102. Advantageously, the sound stimulus includes a software-generated speech structure (e.g., one or more sentences), which are presented to the user in the voice of a person the user's choice (e.g., the voice of a family member, a friend, companion, caregiver an/or significant others). That is, while the sentence, content and structure may be designed according to the methodology of audiologic research, the voice itself corresponds to that of one or more persons in the user's environment that he/she has difficulty of understanding and/or is particularly keen on understanding. As a further advantage, the voice may be tweaked to express an emotion, which in turn may be used to train the user not only in recognizing emotions but in recognizing emotions in the speech of the specific person(s) chosen by the user. According to some embodiments, the voice may be tweaked to express different types of utterances (e.g., indicative sentence, question, command, etc.) and emotions (e.g., happiness, sadness, boredom, surprise, etc.). This advantageously, trains the trainee not only on the phonetic and semantic parts of the language but also on the prosodic features of speech (i.e., intonation) of the specific person(s) chosen by the user.

According to some embodiments processing unit 103 may be local or alternatively processing unit 103 may be remote such as in a cloud computing network.

According to some embodiments, user interface 102 records the user's response to the sound stimulus, and the responses are referred to as the user's "judgement". According to some embodiments, processing unit 103 executes a code configured to analyze the correctness of the user's judgement. Optionally, the code may be configured to provide a feedback regarding the correctness of the judgement via the user interface. Optionally, the processing unit may execute a code configured to repeat the training session by providing sound stimulus with different software-generated speech structure (e.g., different in content and/or using a voice of a different person).

Figure 2:
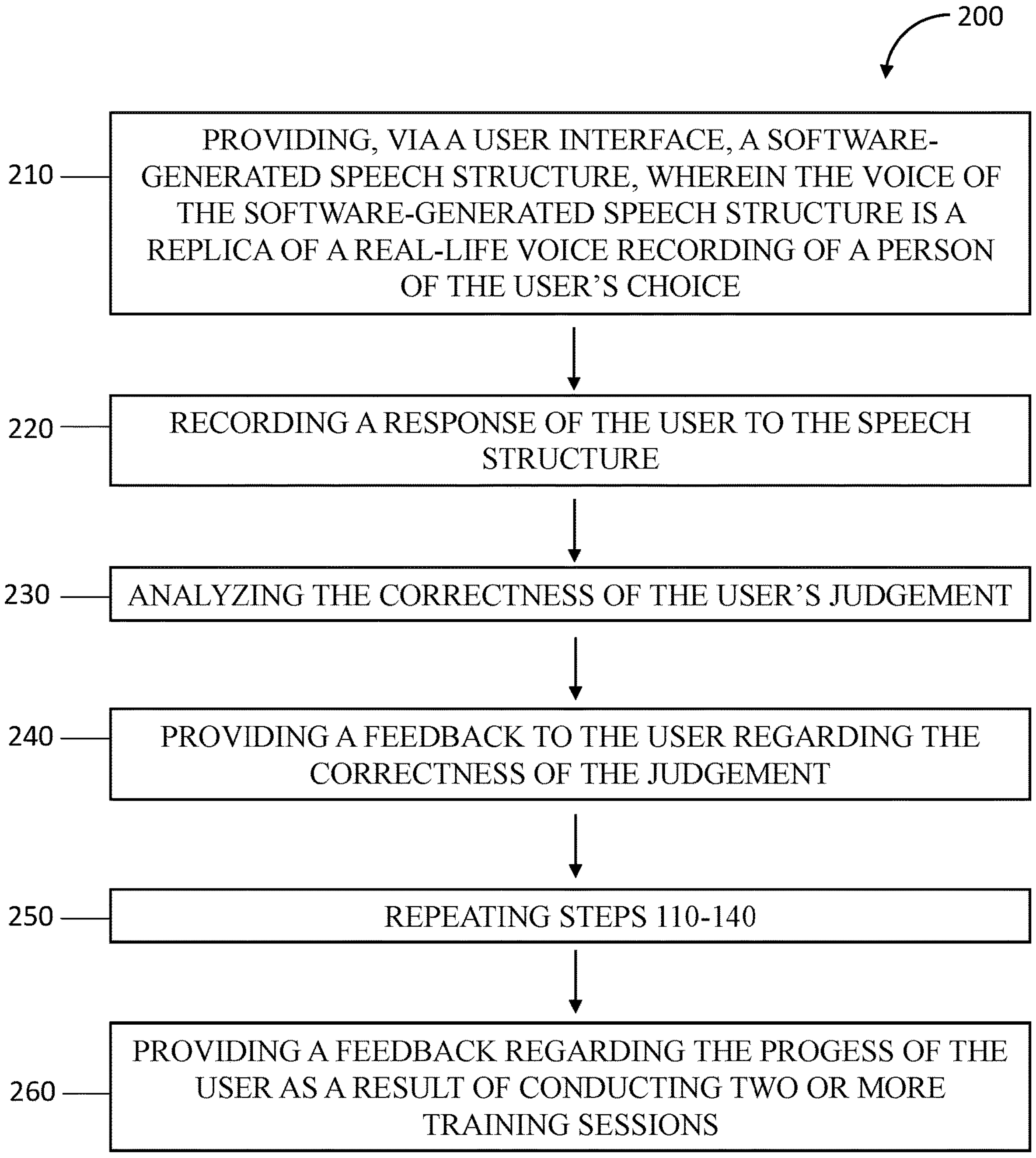
FIG. 2 is a flow chart of the herein disclosed method for auditory training of a hearing aid user, according to some embodiments.

Reference is now made to FIG. 2, which is a flow chart of method 200 for auditory training of a hearing aid user, according to some embodiments.

In step 210 a sound stimulus is provided through a user interface (for example user interface 102) such as a web page or an App to a user's hearing aid or earphones (such as hearing aid or earphones 101). Advantageously, the sound stimulus includes a software-generated speech structure (e.g., one or more sentences), which are presented to the user in the voice of a person the user's choice (e.g., the voice of a family member, a friend, companion, caregiver an/or significant others). That is, while the sentence, content and structure may be designed according to the methodology of audiologic research, the voice itself corresponds to that of one or more persons in the user's environment that he/she has difficulty of understanding and/or is particularly keen on understanding. As a further advantage, the voice may be tweaked to express an emotion, which in turn may be used to train the user not only in recognizing emotions but in recognizing emotions in the speech of the specific person(s) chosen by the user. According to some embodiments, the voice may be tweaked to express different types of utterances (e.g., indicative sentence, question, command, etc.) and emotions (e.g., happiness, sadness, boredom, surprise, etc.). This advantageously, trains the trainee not only on the phonetic and semantic parts of the language but also on the prosodic features of speech (i.e., intonation) of the specific person(s) chosen by the user.

In step 220 the user's response to the sound stimulus is recorded. As a non-limiting example, the user may be requested to choose a correct sentence between different sentences. As another non-limiting example, the user may be requested to identify the emotional state of the person speaking the speech structure. Such responses are generally referred to herein as the users "judgement" regarding the provided sound stimulus.

In step 230, the correctness of the user's judgement is analyzed. The analysis is preferably carried out by applying an algorithm configured to receive the user's responses to the training and to evaluate the correctness of the judgements. According to some embodiments, the correctness may be evaluated binarily, i.e., the answer to a query is correct or incorrect. According to some embodiments, the correctness may be scaled for example on a scale from 1-10.

In step 240, a feedback regarding the correctness of the judgement may be provided to the user via the user interface (e.g. web page or App). According to some embodiments, the feedback may be a score (e.g. you got 5/10 correct answers). Additionally, or alternatively, the feedback may be a qualitative feedback (e.g. you are improving-keep on going). Additionally, or alternatively, the feedback may be an encouragement (e.g. keep up the good work—each time you come back and practice it will be easier).

Optionally, an additional step 250 of repeating the training by reconducting steps 210-240 (or steps 210-230) may be conducted. According to some embodiments, sound stimulus provided in the second training session may contain a different software-generated speech structure (e.g., different in content and/or using a voice of a different person). According to some embodiments, the second training session may be more complex than the first training session. As a non-limiting example, longer sentences may be used. As another non-limiting example, the speech may be provided with an integrated background noise. As another non-limiting example, the signal-to-noise ratio may be reduced by increasing the background noise or changing the type of noise. As another non-limiting example, more complex questions may be raised to the user (e.g., a request to identify emotions).

Optionally, a feedback regarding the progress of the user, based on a comparison of a current session to previous session (step 260), may be provided in addition or instead of the feedback regarding the specific session (step 240).

Figure 3A:
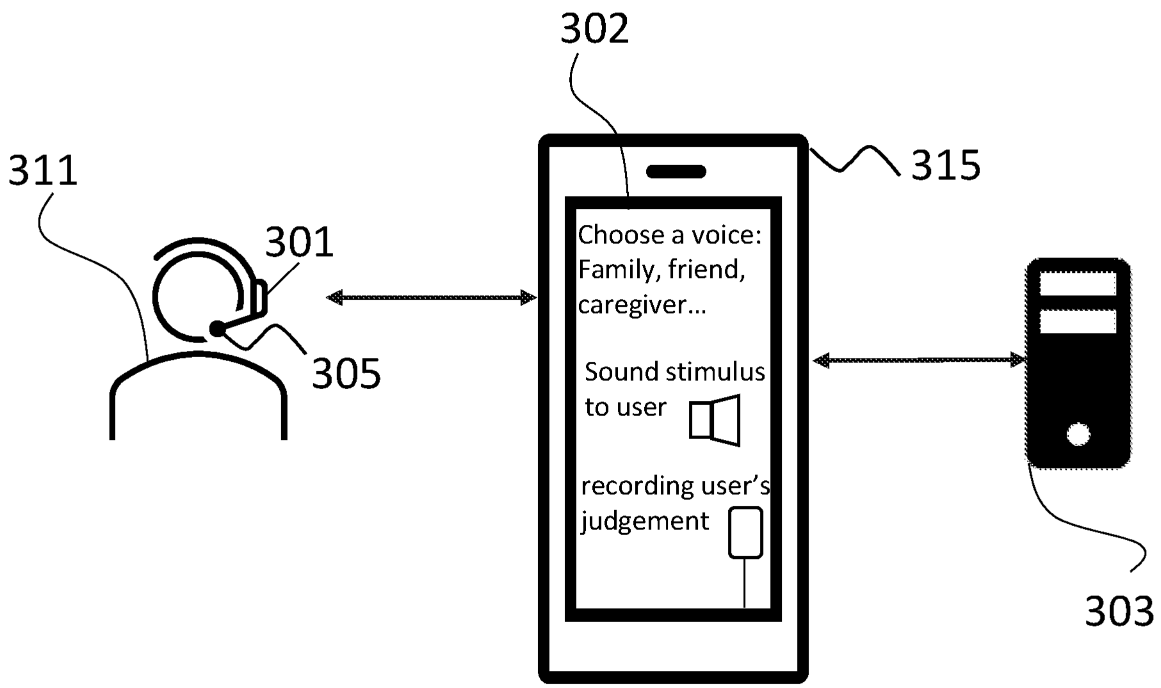
FIGS. 3A-3C schematically show an exemplary case using the herein disclosed method for auditory training of a hearing aid user, according to some embodiments.
Figure 3B:
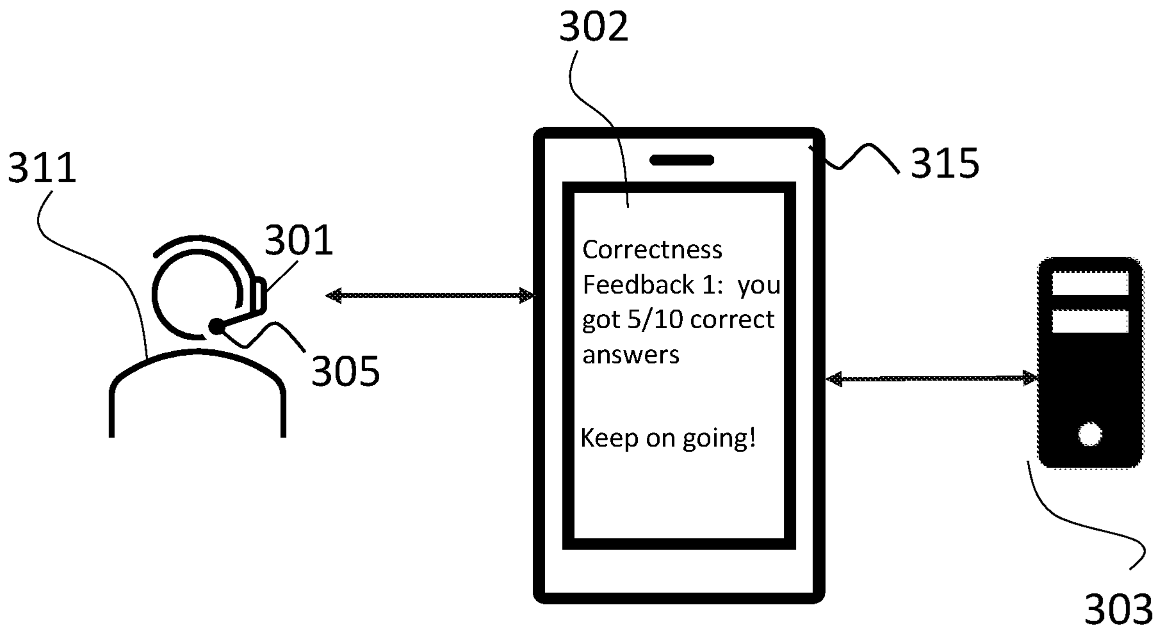
Figure 3C:
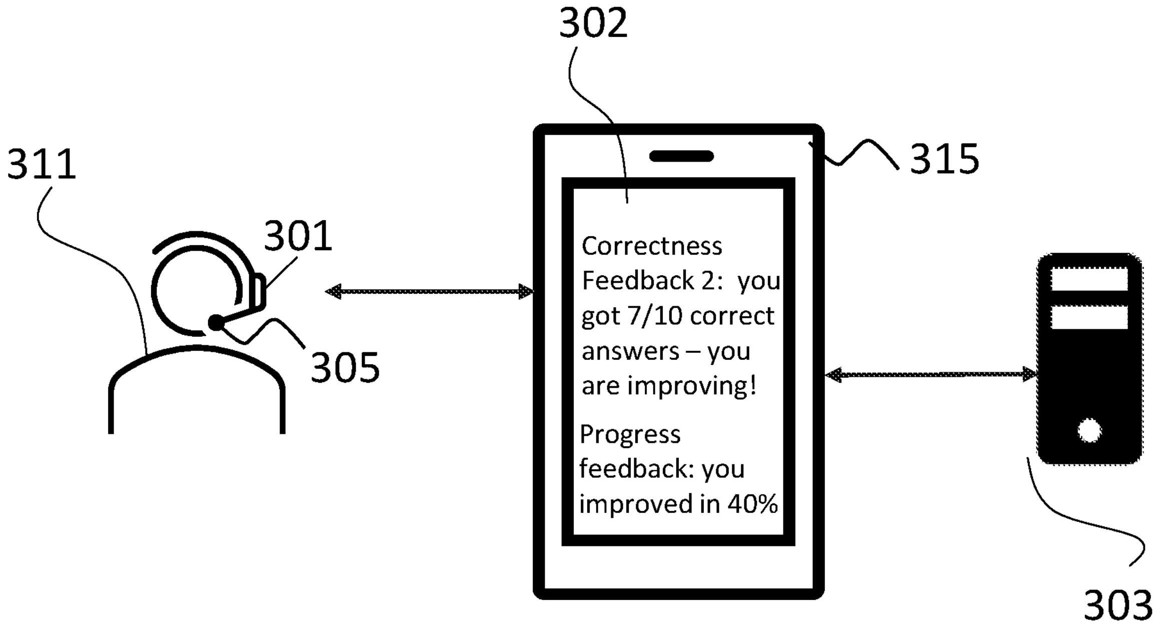

Reference is now made to FIGS. 3A-3C which schematically show an exemplary case using method 200, according to some embodiments. User 311 uses a hearing aid including earphones 301 and microphone 305. In FIG. 3A, user 311 chooses a voice of a person from his environment on which he/she wants to train, for example, the sound of his/her grandchild, and a sound stimulus is provided to user 311 through user interface 302, which is, in this case, an application running on a smartphone 315. The sound stimulus provided includes a software-generated speech structure (e.g., one or more sentences), which are presented to the user in the voice of user's grandchild. A response of the user is recorded, referred to as the user judgement. Processing unit 303 executes a code configured to analyze the user judgement. In FIG. 3B a correctness-feedback is presented to the user. In this case the feedback combines a score and a qualitative-feedback: “you got 5/10 correct answers, keep on going!”.

FIG. 3C schematically shows a second feedback for the correctness of the user judgement, after the user repeated steps 210-230. In this second session, the user gets a score feedback and a qualitative feedback “you got 7/10 correct answer-you are improving!”. Additionally, the user gets a progress feedback with respect to the first session: “you improved in 40%”, Which includes also a quantitative feedback.

Figure 4:
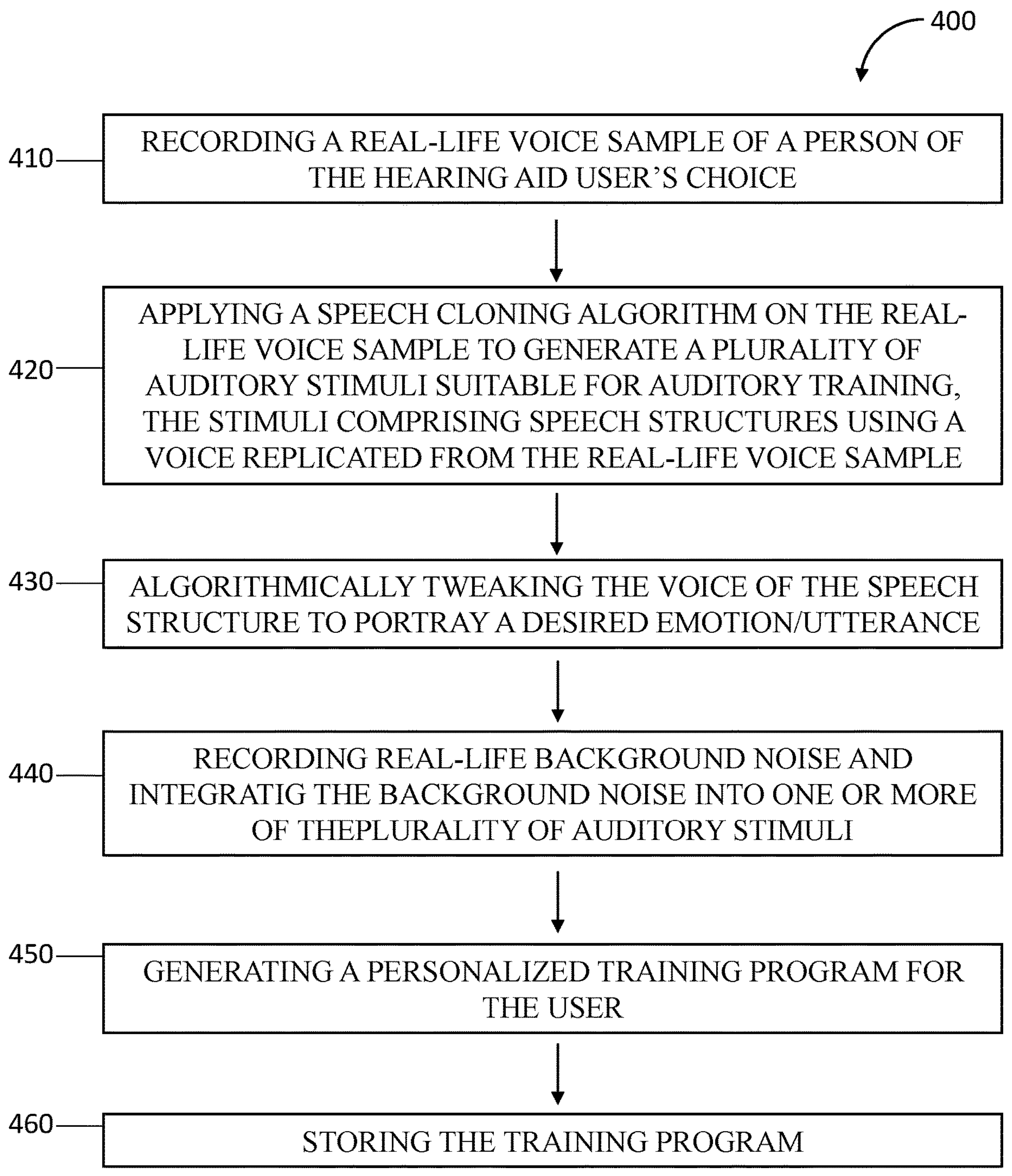
FIG. 4 is a flow chart of the herein disclosed method for generating a personalized auditory training program for a hearing aid user, according to some embodiments.

Reference is now made to FIG. 4, which is a flow chart of a method 400 for generating a personalized auditory training program for a hearing aid user, according to some embodiments.

In step 410, a real-life voice sample of a person of the hearing aid user’s choice (e.g. family member, friend or caregiver) is recorded. The recording may be of single words, or of short sentences. Generally, about 50 words (stand alone or in sentences) are recorded. According to some embodiments, more than one person may be recorded. The adding of additional voices may be conducted during formation of the training program. Alternatively, it may be conducted later, for example as a result of progress in the hearing of a previous voice or as a result of a new need (e.g. a new caregiver).

In step 420 a speech algorithm is applied on the recording, the algorithm configured to clone the voice of the speaker such that the cloned voice can be used to generate new words and sentences (different from those initially recorded) which can be generated as per the need of the training (e.g. in line with the progress of the user).

Optionally, an additional step 430 may be conducted, in which step the voice utilized in the sound stimulus is tweaked to express different emotions (e.g. anger, sorrow, love, worry and the like) and or utterances (e.g. question, command). As above, the tweaking may be generated with the formation of the training program or at a later stage, e.g., following progress in the user’s hearing of the non-tweaked voice.

Additionally, or alternatively, another optional step of recording background noise may be conducted. According to some embodiments, this step may be conducted as part of generating the training program. Alternatively, the step may be conducted later, for example as a result of progress in the user’s hearing ability or as a result of a new or intensified need. According to some embodiments, the background noise recorded may be integrated into the one or more of the plurality of sound stimuli. According to some embodiments, the cloned voice may be provided in the context of the background noise. According to some embodiments, as part of the training program, at a first session, the background noise may be reduced, and the voice of the person chosen by the user may be boosted. At the following session, the background noise may be gradually boosted and the person’s voice chosen by the user may be respectively gradually reduced, until the user succeeds to recognize the chosen person’s voice in a background noise level which corresponds to standard real-life background noise. According to some embodiments, a voice sample of a “cocktail party environment” in which many people speak together, may be recorded as a background noise. In this case, the training program trains the user to identify the chosen person’s voice out of all the rest of the speaking people. In this case, the chosen person’s voice may be boosted during the first session, to help the user to identify the chosen person’s voice, and during the following sessions for example during the fourth following sessions gradually reducing the chosen person’s voice and boosting the background noise of the cocktail party environment, i.e., of the rest of the people speaking together with the chosen person’s. According to some embodiments, optionally a voice which is not the chosen person’s voice, may also be boosted out of the cocktail party environment voice sample. The voice parameters of each of the speakers may be modified according to the training program, in order to help the use to improve the auditory training.

In step 450 a personalized training program may be generated. The training program may include one or more (preferably at least 5) training session each training session including one or more of the plurality of auditory stimuli, wherein some of the stimuli may optionally be auditory stimuli that have been tweaked and/or that have integrated therein real-life background noise.

In step 460 the training program may be stored, e.g., on the user’s personal computer or mobile phone or in a personal field of the web page or App.

While a number of exemplary aspects and embodiments have been discussed above, those of skill in the art will recognize certain modifications, additions and sub-combinations thereof. It is therefore intended that the following appended claims and claims hereafter introduced be interpreted to include all such modifications, additions and sub-combinations as are within their true spirit and scope.

The invention claimed is:

1. A method for personalized auditory training of a hearing aid user, the method comprising:

providing, via a user interface, a sound stimulus, the sound stimulus comprising software-generated speech structure, wherein the voice of the software-generated speech structure is a replica of a real-life voice recording of a person of the user’s choice;

recording a response of the user to the sound stimulus, wherein the response comprises the user’s judgement regarding the provided sound stimulus;

analyzing, using a processing circuit, the correctness of the user’s judgement; and providing, via the user interface, a feedback to the user regarding the correctness of the judgement.

2. The method of claim 1, wherein the real-life voice replica comprises an accent, timbre, pitch, pace, flow of speaking and/or breathing of the person of the user’s choice.

3. The method of claim 1, wherein the real-life voice replica is algorithmically tweaked to portray a desired emotion and/or utterance.

4. The method of claim 1, wherein the sound stimulus further comprises a background noise and/or background speech.

5. The method of claim 4, wherein the background noise has been recorded from a real-life surrounding of the user.

6. The method of claim 1, wherein the sound stimulus comprises software-generated speech structures, generated based on real-life voice replicas of more than one person of the user’s choice.

7. The method of claim 1, further comprising recording real-life speech of the person of the user’s choice.

8. The method of claim 1, further comprising providing a second sound stimulus, a predetermined time after the first sound stimulus, the second sound stimulus comprising a different software-generated speech structure, generated based on the real-life voice replica of a person of the user’s choice, recording a response of the user to the second sound stimulus, wherein the response comprises the user’s judgement regarding the provided sound stimulus; analyzing, using a processing circuit, the correctness of the user's judgement; and providing, via the user interface, a feedback to the user regarding the correctness of the judgement.

9. The method of claim 8, wherein the second sound stimulus is more complex than the first sound stimulus.

10. The method of claim 8, further comprising comparing the response of the user to the first stimulus to the response of the user to the second sound stimulus and providing an indication to the user regarding, via the user interface, an improvement in the user's hearing.

11. The method of claim 1, wherein the sound stimulus is provided to the user via his/her hearing aid.

12. A method for generating a personalized auditory training program for a hearing aid user, the method comprising:

recording a real-life voice sample of a person of the hearing aid user's choice, applying a speech cloning algorithm on the real-life voice sample to generate a plurality of auditory stimuli suitable for auditory training, the auditory stimuli comprising speech structures using a voice replicated from the real-life voice sample; and generating and storing a personalized training program by dividing the plurality of auditory stimuli into at least two training sessions, each training session comprising at least one auditory stimulus.

13. The method of claim 12, wherein further comprising recording background noise and incorporating/integrating the background noise into one or more of the plurality of auditory stimuli.

14. The method of claim 12, further comprising algorithmically tweaking the voice of the speech structure to portray a desired emotion.

15. The method of claim 12, wherein the dividing of the auditory stimuli into training sessions comprises categorizing the plurality of auditory stimuli based on the complexity of the speech structures.

16. The method of claim 15, presenting to the user, via a user interface, a scroll down menu of training session, the training session labeled according to the complexity of the speech structures included in the training session.

* * * * *